C. V. BATES.
SHOCK ABSORBER.
APPLICATION FILED NOV. 30, 1914.

1,154,599.

Patented Sept. 28, 1915.

Witnesses
Arthur V. Carbon
Robert N. Weir

Inventor
Clifford V. Bates
by James R. Offield, Atty.

COLUMBIA PLANOGRAPH CO., WASHINGTON, D. C.

UNITED STATES PATENT OFFICE.

CLIFFORD V. BATES, OF CHICAGO, ILLINOIS.

SHOCK-ABSORBER.

1,154,599.  Specification of Letters Patent.  Patented Sept. 28, 1915.

Application filed November 30, 1914.  Serial No. 874,655.

*To all whom it may concern:*

Be it known that I, CLIFFORD V. BATES, a citizen of the United States, residing at Chicago, county of Cook, and State of Illinois, have invented certain new and useful Improvements in Shock-Absorbers, of which the following is a specification.

My invention relates to shock absorbers or supplementary springs for motor vehicles designed to absorb the shock transmitted to an axle of a vehicle and thus preventing its transmission to the vehicle body.

The principal object of the invention is to improve upon constructions heretofore designed for a like object, both as to cost and efficiency.

One of the main points of novelty of the invention resides in two spring coils having their inner ends connected and their outer ends secured to relatively movable parts of a vehicle and each coil serving to check the vibration of the other coil.

Other points of novelty will be hereinafter referred to more specifically in the specification and claims while the details of the invention are disclosed in the accompanying drawing, in which—

Figure 1:
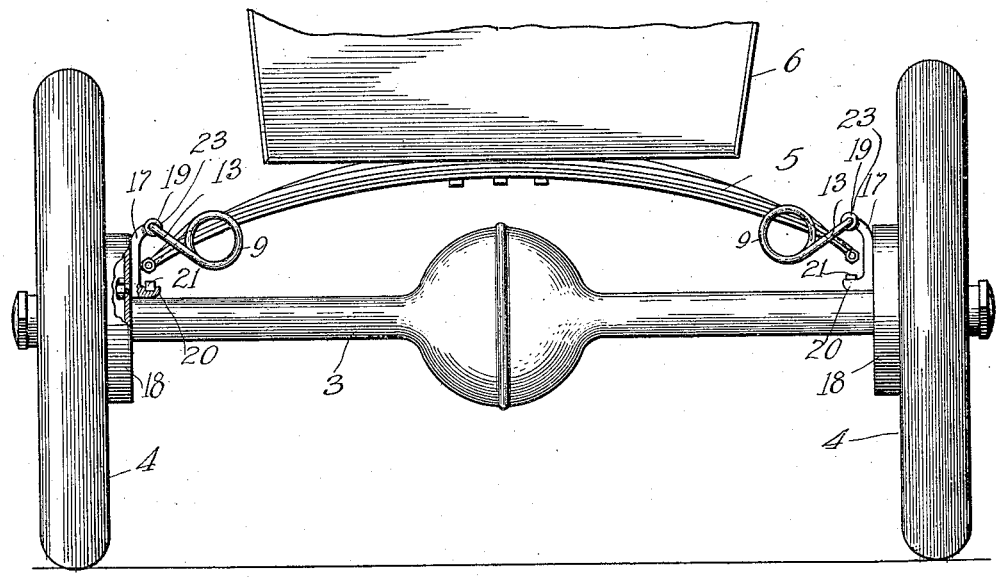
Figure 2:
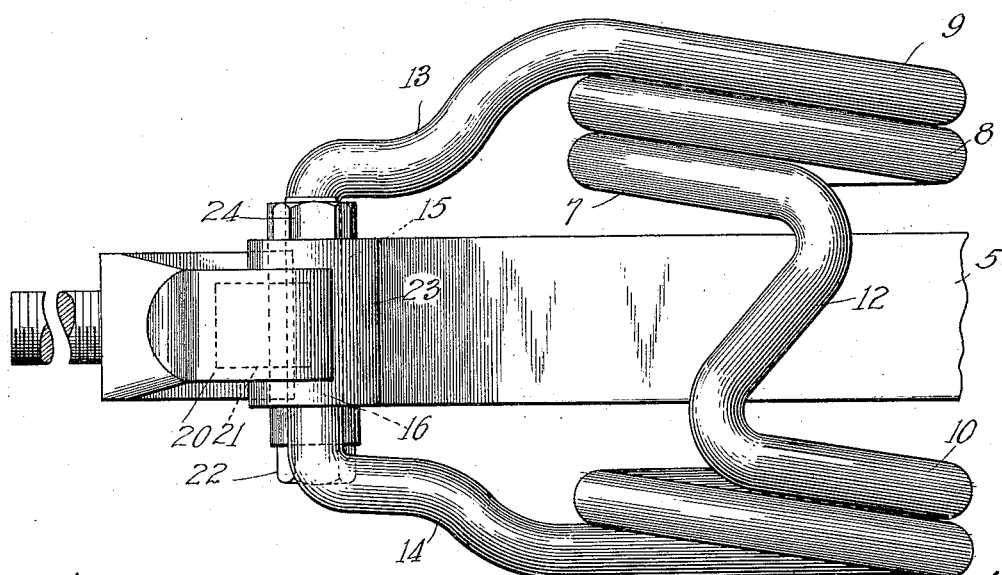

Figure 1 is a rear view of a motor vehicle with my improved shock absorber applied thereto. Fig. 2 is a bottom plan view of the left shock absorber shown in Fig. 1.

Referring now more particularly to the drawing, the rear axle housing 3, wheels 4, leaf spring 5 and vehicle body 6, represent a common form of motor vehicle construction constituting no part of my invention.

There may be two or four shock absorbers applied to a motor vehicle, but a description of one, with its application to the vehicle, will serve as a standard for all.

My improved construction comprises a single piece of heavy spring material, preferably round, and so formed as to provide two coils, one coil comprising substantially two convolutions 7 and 8 and a section of a convolution 9, while the other coil comprises substantially one convolution 10 and a section of a convolution 11.

The inner terminals or ends of the inner convolutions 7 and 10 are connected by the intermediate member 12 which is preferably formed integral with the single piece of material from which the coils are constructed but which is disposed at an angle to the axes of the coils for the purpose of providing a substantially rigid connection between the inner ends of adjacent convolutions. It is also to be noted that the inner ends of the coils 7 and 10, where they join the intermediate member 12, are arranged in opposite relation or, if continued, would cross the common axes of the coils in opposite directions.

The outer ends of the convolutions 9 and 11 are extended to form arms 13 and 14 and the ends of the arms are bent inward, parallel to the common axis of the coils, to serve as bolts 15 and 16 respectively, and the ends of which are threaded to receive nuts.

Mounted upon the rear axle casing are the posts 17 which are secured to the rear axle casing 3, or to the brake housings 18, in any suitable manner. The upper end of each post 17 is provided with an eye 19 while the lower end of each post is provided with a base 20 upon which a cushion 21 is mounted.

In securing my improved structure to a motor vehicle the bolt 15 at the end of the arm 13 is passed through the eye 19 of one of the standards 17 and secured to said standard by the nut 22. The leaf spring 5, which is provided with eyes 23 at its ends, is then arranged between the two coils and above the intermediate connecting member 12 between the inner ends of said coils. The bolt 16 on the arm 14 is then passed through the eye 23 at one end of said leaf spring and secured thereto by means of the nut 24. It is, of course, understood that each end of the leaf spring 5 is suspended by a shock absorber in the manner as thus described.

One of the coils is of greater strength than the other coil, having substantially one more convolution, and the arm 13, extending from the coil having the greater number of convolutions, is connected to the post 17. This is for the reason that a greater shock is transmitted to a shock absorber from the rear axle than from the vehicle body.

The action of the shock absorber, in actual use, is as follows: When a shock from the road is transmitted to the axle, the axle rises carrying one or both of the posts 17, thus raising the arm 13 and decreasing the diameter of the coils 7, 8 and 9. If the shock is so great that it is not absorbed by the larger coil it is transmitted to the intermediate member 12. Under an upward thrust of the arm 13 the inner end of the convolution 7 moves toward the bolt end 15 and as the intermediate section of metal 12 forms a rigid connection between the two inner convolutions, this causes the convolutions 10 and 11 to be reduced in diameter, thus absorbing a portion of the shock originally transmitted to the rear axle. If the shock is so severe that the vibrations pass through the shock absorber and into the spring 5 causing the vehicle body 6 to rise, the inner end of the convolution 10 then moves away from its pivotal connection with the spring. But by virtue of the rigid member 12 the inner covolution 7 of the larger coil has its diameter reduced so that whenever the diameter of one coil is increased it is working against the action of the other coil and thus at all times tending to stop vibration.

The arm 13 that is secured to the post 17 is longer than the arm 14 and thus permits of the end of the leaf spring being positioned below the end of the post 17, when assembling the parts. The cushion 21 is only placed upon the post 17 as a precautionary measure for if the supplemental springs are properly designed there will be no need for a cushion except possibly in extreme cases.

The horizontal movement of the vehicle body relative to the chassis has substantially the same effect upon the supplemental springs as the vertical movement of the vehicle body, in that, whenever the movement of the vehicle body increases the diameter of the convolutions in the smaller coil, this has the effect of bringing the other coil into play and decreasing the diameter between the convolutions of the larger coil so that one coil is at all times tending to stop the vibration of the other coil.

Having now described my invention, I claim—

1. A supplemental spring for motor vehicles, comprising two spring coils having their inner convolutions joined together, and arms extending from the outer convolutions for connecting said coils to relatively movable parts of a vehicle.

2. A supplemental spring for motor vehicles, comprising two spring coils having their inner convolutions rigidly connected, and arms extending from their outer convolutions and means at the ends of said arms for connecting the same to relatively movable parts of a vehicle.

3. A supplemental spring for motor vehicles, comprising two spring coils having their inner convolutions rigidly connected, and arms extending from their outer convolutions and provided with inturned ends having their axes parallel with the axes of said coils.

4. A supplemental spring for motor vehicles, comprising two separated coils having their inner convolutions rigidly connected and arms extending from the outer convolutions and in different planes, said arms having inturned ends.

5. A supplemental spring for motor vehicles, comprising two separated coils of unequal strength and having their inner convolutions rigidly connected and arms extending from the outer convolutions for connecting said coils to relatively movable parts of a vehicle.

6. A supplemental spring for motor vehicles, comprising two spring coils having a common axis and their inner convolutions terminating below their axes and connected, and arms extending from the outer convolutions and disposed upon opposite sides of the axes of said coils.

7. A supplemental spring for motor vehicles comprising two spring coils having their inner covolutions terminating below their axes and extending in opposite directions, said inner convolutions being joined, and arms extending from the outer convolutions and arranged upon opposite sides of the axes of said coils.

CLIFFORD V. BATES.

Witnesses:
SADIE M. RYAN,
JAMES R. OFFIND.

Copies of this patent may be obtained for five cents each, by addressing the "Commissioner of Patents, Washington, D. C."